No. 665,937. Patented Jan. 15, 1901.
G. SCHNEIDER.
COMBINED FAUCET AND DRIP CUP.
(Application filed Apr. 12, 1900.)

(No Model.)

Witnesses:—
Wm. H. Vail.
F. S. Stitt.

Inventor:—
George Schneider
By Chas. B. Mann
Attorney.

UNITED STATES PATENT OFFICE.

GEORGE SCHNEIDER, OF BALTIMORE, MARYLAND.

COMBINED FAUCET AND DRIP-CUP.

SPECIFICATION forming part of Letters Patent No. 665,937, dated January 15, 1901.

Application filed April 12, 1900. Serial No. 12,506. (No model.)

*To all whom it may concern:*

Be it known that I, GEORGE SCHNEIDER, a citizen of the United States, residing at Baltimore, in the State of Maryland, have invented certain new and useful Improvements in a Combined Faucet and Drip-Cup, of which the following is a specification.

My invention is an improvement in combined faucets and drip-cups especially adapted for use on oil-tank wagons.

The highly-inflammable character of gasolene, coal-oil, and other liquid fuels used for cooking, heating, and lighting purposes renders it necessary that great precautions shall be taken in dispensing them from oil-tank wagons. For this reason faucets for this purpose have the upper ends of their keys or plugs provided with a head to receive a wrench, whereby to turn the plug, and the nuts which secure the plugs to their seats are usually tightened, so as to avoid leakage and accidental turning of the plug and the consequent opening of the faucet.

Two serious difficulties have been encountered in the faucets constructed as just described. First, the driver or tender of the wagon wishing the faucet-plug to turn easily will loosen the nut on the plug, and as soon as the nut is thus loosened the plug will be liable to leak and drip at the nut, and, secondly, if the nut on the plug is not loosened it will bear so tightly against its washer and bind the plug so tightly that the plug will, on account of friction, wear away, which will thus also permit the plug to leak and drip at the nut. My invention obviates these difficulties by providing a combined faucet and drip-cup in which the drip-cup will partially inclose or surround the nut and the lower end of the plug and which will prevent the nut from being loosened as long as the drip-cup is in place and will catch all drippings both from the mouth of the faucet and around the plug.

Reference is to be had to the accompanying drawings, in which—

Figure 1:
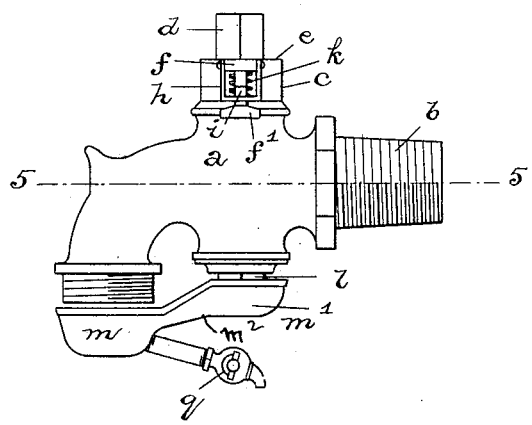
Figure 2:
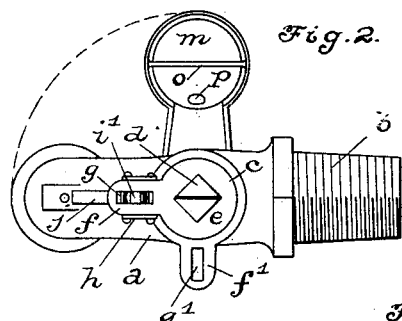
Figure 3:
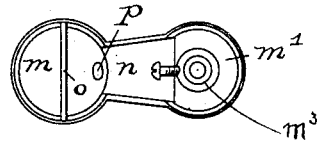
Figure 4:
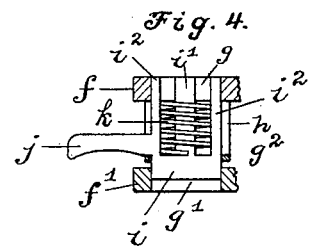
Figure 5:
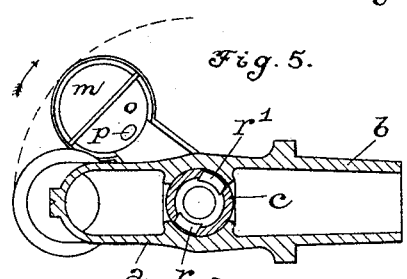
Figure 6:
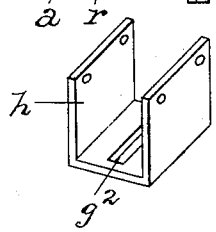

Figure 1 is a side elevation of my improved faucet and drip-cup in the normal closed position. Fig. 2 is a plan view of the same with the plug and drip-cup in the position they assume when the ports are open for the discharge of the liquid. Fig. 3 is a plan view of the drip-cup alone. Fig. 4 is a vertical sectional view of the bracket and spring-catch on a larger scale. Fig. 5 is a horizontal section of the faucet on the line 5 5 of Fig. 1, and Fig. 6 is a detail perspective view of the supporting-bracket for the spring-catch.

The faucet-casing $a$ is provided with the usual tapered screw-threaded end $b$ and a stationary laterally-extending ear $f'$, having a slot $g'$. A vertical rotary plug $c$ is mounted in said casing $a$. Said plug at its upper end is provided with a square head $d$, adapted to receive a wrench to turn the plug. Below the head $d$ the plug is provided with a shoulder $e$, and an ear $f$ extends laterally from said shoulder and is provided with a slot $g$. A suitable bracket $h$ is secured to the ear $f$ on the plug and hangs below said ear and is provided in its bottom with a slot $g^2$, which latter when the plug is in the extreme cut-off position is in vertical alinement with the other slots $g$ and $g'$. A vertically-movable bolt $i$ has a central stem $i'$, two vertical prongs $i^2$, one at either side of the stem, and a laterally-extending arm $j$. This bolt is supported by the bracket $h$, with its upper end projecting through the slot $g$ on the plug-ear and its lower end adapted to pass through the slot $g^2$ in the bracket. A spiral spring $k$ surrounds the central stem $i'$ of the bolt, with its upper end pressing upward against the under surface of the ear $f$ on the plug and its lower end pressing downward on the bolt at each side of said central stem $i'$. It will thus be seen that the bracket $h$, bolt $i$, and spring $k$ are carried by the ear $f$ on the plug and of course turn with the plug. When the plug is in the extreme cut-off position, as in Fig. 1, the lower end of the bolt $i$ will be pressed down into the slot $g'$ of the stationary ear $f'$ and lock the plug to prevent accidental turning.

The plug $c$ is provided at its lower end with an ordinary nut $l$, which secures the plug to its seat.

My improved drip-cup consists of a bowl $m$, provided with a laterally-extending upwardly-inclined trough $m^2$, whose upper end $m'$ partially surrounds and incloses the lower end of the plug $c$ and the nut $l$. Rising from the center of the upper inclosing end $m'$ of the trough $m^2$ is a socket $m^3$, which fits on the lower end of the plug $c$ below the nut $l$, and a set-screw $n$, working through a side of said socket, impinges against the lower end of the plug immediately below the nut $l$. By this arrangement the drip-cup is caused to turn with the plug, the bowl $m$ being swung to and from the mouth of the faucet when the plug is turned to close or open the same. The bowl $m$ of the drip-cup is provided with a cross-bar $o$ and a drain-port $p$, into which a drain-cock $q$ is tapped. It may be desirable to place a wad of cotton-waste or some other absorbent material in the bowl $m$, in which event the cross-bar $o$ will serve to retain the same in place. By packing the bowl $m$ with some suitable absorbent material the liquid dripping from the mouth of the faucet will not slop over.

Now it will be seen the construction of the set-screw $n$ by reason of the fact that it impinges against the lower end of the plug $c$, directly below the nut $l$, acts as a sort of lock for said nut and prevents the same from working loose, and it also prevents the driver or tender of the wagon from tampering with the nut $l$ without the trouble of first removing the drip-cup. It will also be seen that by my construction and arrangement of drip-cup with its bowl $m$ and inclined trough $m^2$, with its upper inclosing end $m'$, all the drippings are caught, both from the mouth of the faucet and from around the lower end of the plug $c$ and the nut $l$, and all drippings into the upper inclosing end $m'$ of the trough $m^2$ from around the plug at the nut will flow down the inclined trough $m^2$ into the lower bowl $m$, where they will be collected. The drippings collected in the bowl $m$ can be drawn off through the drain-port $p$ and drain-cock $q$.

While the invention has been particularly designed for faucets applicable to oil-tank wagons, it is obvious that faucets with this improvement may be used for other purposes.

Having thus described my invention, what I claim as new, and desire to secure by Letters Patent, is—

1. The combination with a faucet having a rotary plug, of a drip-cup comprising a bowl provided with a laterally-extending inclined trough secured to and partially inclosing and surrounding the lower end of said plug, as set forth.

2. The combination of a faucet having a vertical rotary key or plug provided at its lower end with a nut which confines it in the faucet-case; a drip-cup fitted on the lower end of the said key or plug below the nut; and a set-screw on said drip-cup the end of the screw impinging against the lower end of the key or plug, whereby the drip-cup is held in proper position and the nut on the key or plug cannot be tampered with.

3. The combination with a faucet provided with a rotary plug having at its lower end a nut which confines it in the faucet-casing, of a drip-cup comprising an inclined trough whose upper end is secured to and partially incloses and surrounds the lower end of said plug and nut; and a bowl on the lower end of said trough adapted to swing underneath the faucet when the plug is turned to close the same and provided with a drain-cock, as set forth.

4. The combination with a faucet provided with a rotary plug having at its lower end a nut which confines it in the faucet-casing, of a drip-cup comprising a bowl provided with a laterally-extending inclined trough whose upper end is formed with a socket fitted on the lower end of said plug; and a set-screw working through said socket and impinging against said plug directly below the nut, as set forth.

In testimony whereof I affix my signature in the presence of two witnesses.

GEORGE SCHNEIDER.

Witnesses:
CHARLES L. VIETSCH,
CHARLES B. MANN, Jr.